(12) United States Patent
Cha

(10) Patent No.: US 11,876,185 B2
(45) Date of Patent: Jan. 16, 2024

(54) METHOD FOR MANUFACTURING SECONDARY BATTERY AND SECONDARY BATTERY

(71) Applicant: LG Energy Solution, Ltd., Seoul (KR)

(72) Inventor: In Young Cha, Daejeon (KR)

(73) Assignee: LG Energy Solution, Ltd.

( * ) Notice: Subject to any disclaimer, the term of this patent is extended or adjusted under 35 U.S.C. 154(b) by 92 days.

(21) Appl. No.: 17/606,942

(22) PCT Filed: Aug. 3, 2020

(86) PCT No.: PCT/KR2020/010210
§ 371 (c)(1),
(2) Date: Oct. 27, 2021

(87) PCT Pub. No.: WO2021/054603
PCT Pub. Date: Mar. 25, 2021

(65) Prior Publication Data
US 2022/0238924 A1 Jul. 28, 2022

(30) Foreign Application Priority Data
Sep. 16, 2019 (KR) .................. 10-2019-0113711

(51) Int. Cl.
*H01M 10/0587* (2010.01)
*H01M 10/04* (2006.01)
(Continued)

(52) U.S. Cl.
CPC ..... *H01M 10/0587* (2013.01); *H01M 10/049* (2013.01); *H01M 10/446* (2013.01);
(Continued)

(58) Field of Classification Search
CPC ........... H01M 10/0587; H01M 10/049; H01M 50/136; H01M 50/184; H01M 50/171
See application file for complete search history.

(56) References Cited

U.S. PATENT DOCUMENTS

2010/0291423 A1 11/2010 Hideo et al.
2011/0151292 A1 6/2011 Song
(Continued)

FOREIGN PATENT DOCUMENTS

CN 103000960 A 3/2013
CN 205543089 U 8/2016
(Continued)

OTHER PUBLICATIONS

Machine Translation of: KR 10-2014-0046174, Gong, Apr. 18, 2014.*
(Continued)

*Primary Examiner* — Kenneth J Douyette
(74) *Attorney, Agent, or Firm* — Lerner David LLP

(57) ABSTRACT

A method for manufacturing a secondary battery includes accommodating an electrode assembly in a battery case including an accommodation part and a gas pocket part connected to the accommodation part to collect a gas generated in the accommodation part, performing sealing along an outer circumferential surface of the battery case except for an end of the gas pocket part, injecting an electrolyte into the accommodation part through the end of the gas pocket part, performing double sealing on the end of the gas pocket part so that a first sealing part is formed at a side closer to the accommodation part, and a second sealing part is formed at a side that is farther from the accommodation part, removing a portion, on which the second sealing part is formed, from the battery case, and applying electricity to the electrode assembly to charge the secondary battery.

13 Claims, 13 Drawing Sheets

(51) Int. Cl.
   H01M 10/44    (2006.01)
   H01M 50/136   (2021.01)
   H01M 50/184   (2021.01)
   H01M 50/171   (2021.01)
   H01M 10/52    (2006.01)
   H01M 50/30        (2021.01)
   H01M 50/636       (2021.01)
   H01M 10/0525      (2010.01)

(52) U.S. Cl.
   CPC ......... *H01M 10/52* (2013.01); *H01M 50/136* (2021.01); *H01M 50/171* (2021.01); *H01M 50/184* (2021.01); *H01M 10/0525* (2013.01); *H01M 50/394* (2021.01); *H01M 50/636* (2021.01); *H01M 2200/20* (2013.01)

(56) References Cited

U.S. PATENT DOCUMENTS

| | | | |
|---|---|---|---|
| 2014/0272488 A1* | 9/2014 | Kim | H01M 10/058 |
| | | | 429/56 |
| 2015/0207119 A1 | 7/2015 | Onodera et al. | |
| 2016/0336593 A1 | 11/2016 | Honda et al. | |
| 2016/0372799 A1 | 12/2016 | Watanabe et al. | |
| 2019/0074538 A1* | 3/2019 | Lee | H01M 4/625 |
| 2020/0295315 A1 | 9/2020 | Kim et al. | |
| 2020/0358044 A1 | 11/2020 | Jang | |
| 2020/0403263 A1 | 12/2020 | Bae et al. | |

FOREIGN PATENT DOCUMENTS

| | | | |
|---|---|---|---|
| CN | 110226254 A | 9/2019 | |
| JP | 2009021067 A | 1/2009 | |
| KR | 20040081521 A | 9/2004 | |
| KR | 20100124209 A | 11/2010 | |
| KR | 20110072733 A | 6/2011 | |
| KR | 20140015647 A | 2/2014 | |
| KR | 20140046174 A | 4/2014 | |
| KR | 20150113660 A | 10/2015 | |
| KR | 20160080559 A | 7/2016 | |
| KR | 20160102026 A | 8/2016 | |
| KR | 20170019854 A | 2/2017 | |
| KR | 20170132565 A | 12/2017 | |
| KR | 20180059373 A | 6/2018 | |
| KR | 20190042797 A | 4/2019 | |
| KR | 20190054735 A | 5/2019 | |
| KR | 20190055594 A | 5/2019 | |
| KR | 20190072410 A | 6/2019 | |
| KR | 20190074591 A | 6/2019 | |
| WO | 2014041970 A1 | 3/2014 | |
| WO | 2018-0147549 A1 | 8/2018 | |

OTHER PUBLICATIONS

Machine Translation of: KR 10-2018-0059373, Kim et al., Jun. 4, 2018.*

Extended European Search Report including Written Opinion for Application No. 20865190.1 dated May 12, 2022, pp. 1-10.

Search Report dated Dec. 28, 2022 from Office Action for Chinese Application No. 202080029906.X dated Jan. 10, 2023. 3 pgs. (see p. 2, categorizing the cited references).

International Search Report for PCT/KR2020/010210 dated Nov. 13, 2020. 2 pgs.

Search Report dated Jun. 2, 2023 from Office Action for Chinese Application No. 202080029906.X dated Jun. 8, 2023. 2 pgs. (see p. 1, categorizing the cited references).

* cited by examiner

METHOD FOR MANUFACTURING SECONDARY BATTERY AND SECONDARY BATTERY

CROSS-REFERENCE TO RELATED APPLICATIONS

The present application is a national phase entry under 35 U.S.C. § 371 of International Application No. PCT/KR2020/010210, filed Aug. 3, 2020, published in Korean, which claims the benefit of the priority of Korean Patent Application No. 10-2019-0113711, filed on Sep. 16, 2019, both of which are hereby incorporated by reference in their entireties.

TECHNICAL FIELD

The present invention relates to a method for manufacturing a secondary battery and a secondary battery.

BACKGROUND ART

Secondary batteries are rechargeable unlike primarily batteries, and also, the possibility of compact size and high capacity is high. Thus, recently, many studies on secondary batteries are being carried out. As technology development and demands for mobile devices increase, the demands for secondary batteries as energy sources are rapidly increasing.

Rechargeable batteries are classified into coin type batteries, cylindrical type batteries, prismatic type batteries, and pouch type batteries according to a shape of a battery case. In such a secondary battery, an electrode assembly mounted in a battery case is a chargeable and dischargeable power generating device having a structure in which an electrode and a separator are stacked.

The electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

Lithium ion secondary batteries are manufactured through processes such as primary charging, aging, and degassing after accommodating an electrode assembly and an electrolyte in a pouch. Here, when a large amount of residual gas exists in the pouch after the primary charging, there has been a problem that difficulties in a transfer process for subsequent processes are caused due to an increase in volume of a cell. Particularly, the gas remaining in an electrode causes precipitation of lithium ions.

DISCLOSURE OF THE INVENTION

Technical Problem

One aspect of the present invention is to provide a method for manufacturing a secondary battery, in which an internal gas generated during charging and activating when the secondary battery is manufactured is capable of being automatically discharged, and a secondary battery.

Technical Solution

A method for manufacturing a secondary battery according to an embodiment of the present invention comprises: an accommodation step of accommodating an electrode assembly in a battery case comprising an accommodation part, in which the electrode assembly is accommodated, and a gas pocket part connected to the accommodation part to collect a gas generated in the accommodation part; a first sealing step of performing sealing along an outer circumferential surface of the battery case except for an end of the gas pocket part; an electrolyte injection step of injecting an electrolyte into the accommodation part through the end of the gas pocket part; a second sealing step of performing double sealing on the end of the gas pocket part so that a first sealing part is formed at a side closer to the accommodation part, and a second sealing part is formed at a side that is farther from the accommodation part; a second sealing part removing step of removing a portion, on which the second sealing part is formed, from the battery case; and a charging step of applying electricity to the electrode assembly to charge the secondary battery, wherein, in the second sealing step, the first sealing part is discontinuously formed so that a non-fused part for degassing and a fused part are formed along a sealing line, and when an internal pressure increases due to a gas generated through the charging step, the non-fused part for degassing is gaped to discharge the gas to an outside through the non-fused part for degassing.

The secondary battery according to an embodiment of the present invention may be manufactured through the method for manufacturing the secondary battery according to an embodiment of the present invention.

Advantageous Effects

According to the present invention, the first sealing part may be formed on the gas pocket part of the battery case to form the non-fused part for degassing and the fused part. As a result, when the secondary battery is charged, the internal pressure may increase due to the generated gas, and thus, the non-fused part for degassing may be gaped to automatically discharge the internal gas to the outside through the non-fused part for degassing. Therefore, the secondary battery may be prevented from increasing in volume, and the gas may not remain in the electrode to prevent the lithium ions from being precipitated.

MODE FOR CARRYING OUT THE INVENTION

Figure 1:
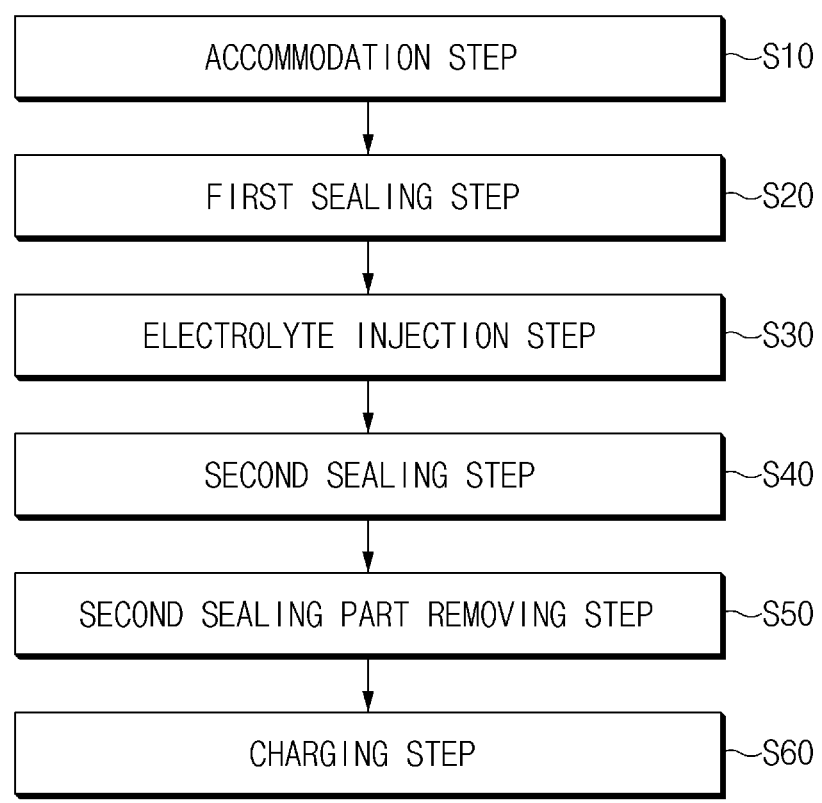
FIG. 1 is a flowchart illustrating a method for manufacturing a secondary battery according to an embodiment of the present invention.

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

Figure 2:
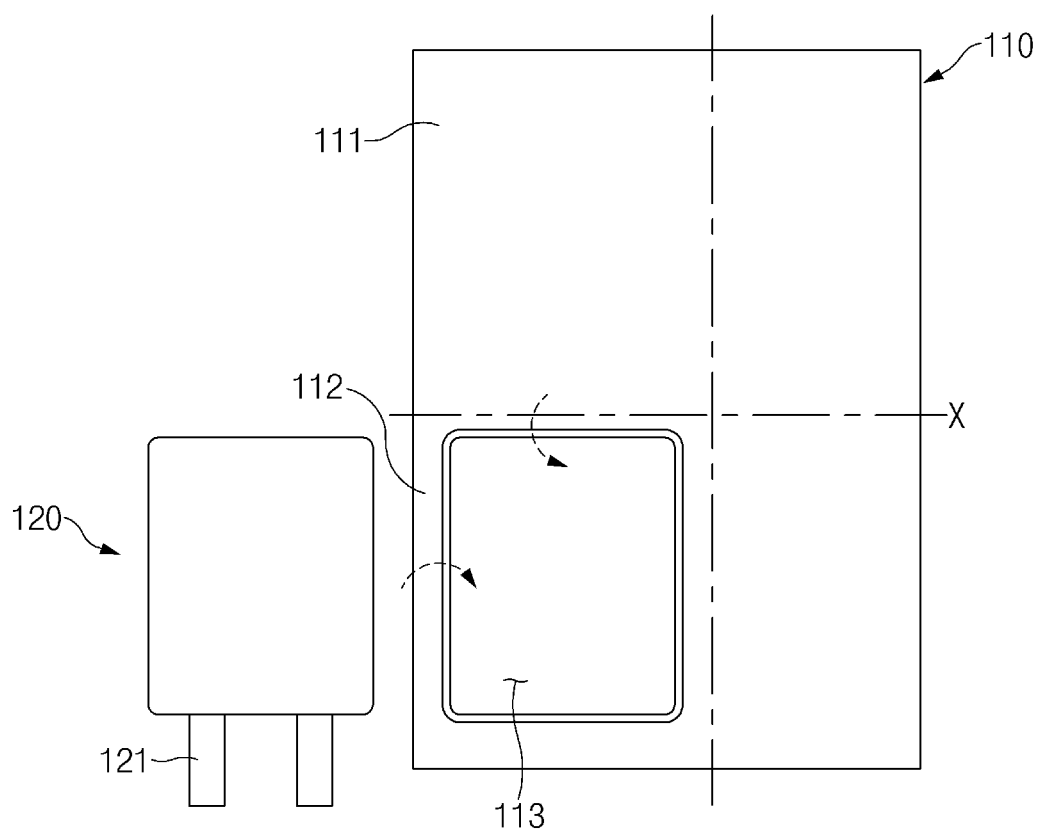
FIG. 2 is a plan view illustrating a state before the electrode assembly is accommodated in an accommodation step in a method for manufacturing a secondary battery according to a first embodiment of the present invention.
Figure 3:
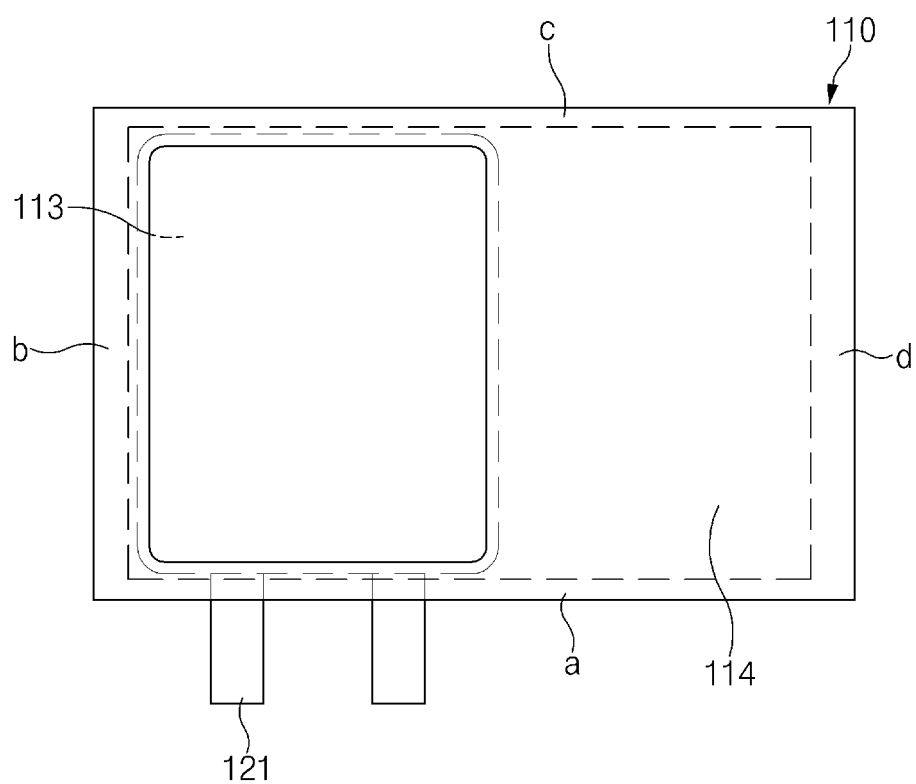
FIG. 3 is a plan view illustrating a state in which the electrode assembly is accommodated in the accommodation step in the method for manufacturing the secondary battery according to the first embodiment of the present invention.

FIG. 1 is a flowchart illustrating a method for manufacturing a secondary battery according to an embodiment of the present invention, FIG. 2 is a plan view illustrating a state before the electrode assembly is accommodated in an accommodation step in a method for manufacturing a secondary battery according to a first embodiment of the present invention, and FIG. 3 is a plan view illustrating a state in which the electrode assembly is accommodated in the accommodation step in the method for manufacturing the secondary battery according to the first embodiment of the present invention.

Figure 4:
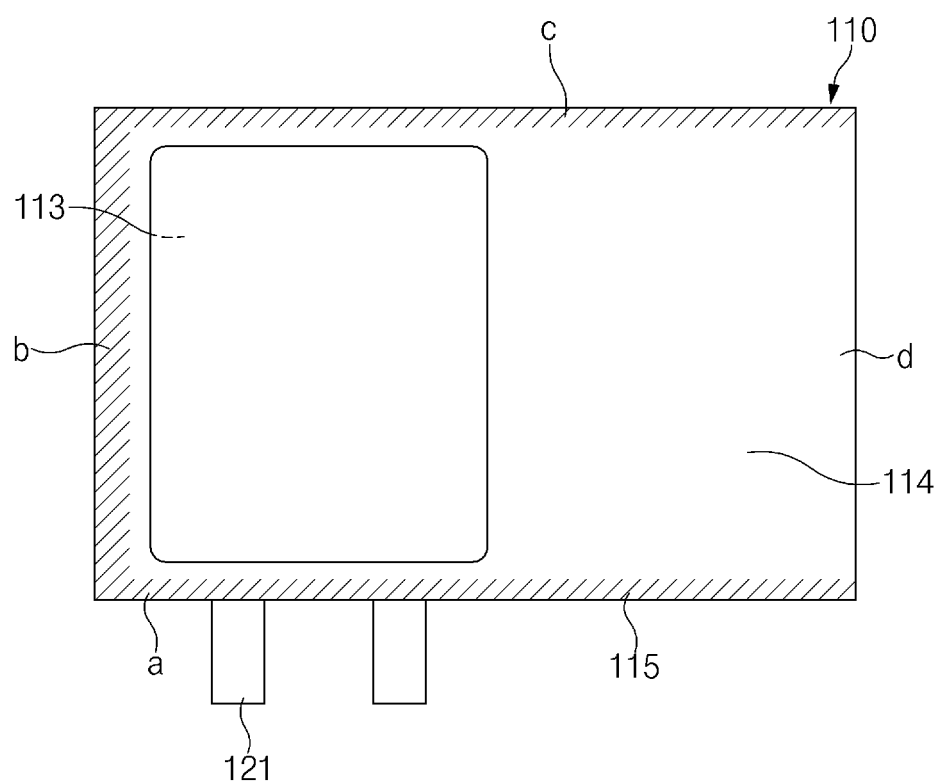
FIG. 4 is a plan view illustrating a first sealing step in the method for manufacturing the secondary battery according to the first embodiment of the present invention.
Figure 5:
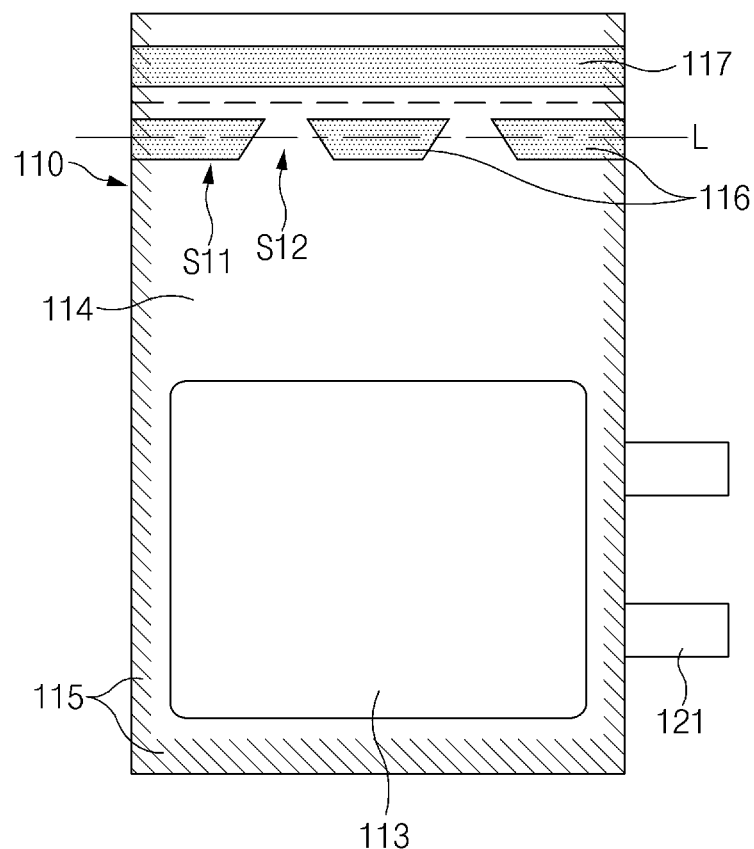
FIG. 5 is a plan view illustrating a second sealing step in the method for manufacturing the secondary battery according to the first embodiment of the present invention.
Figure 6:
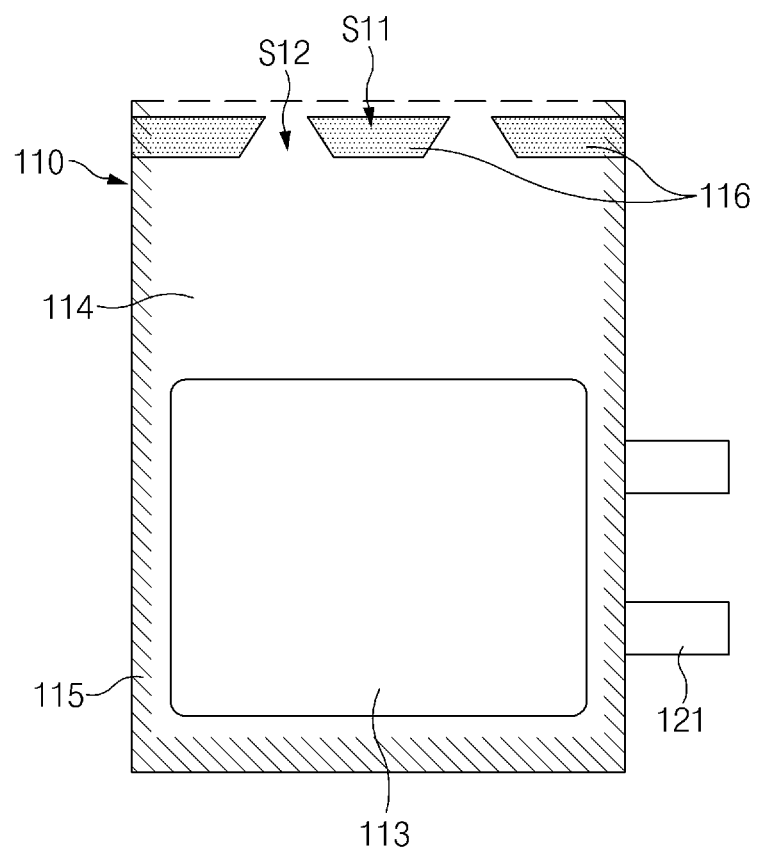
FIG. 6 is a plan view illustrating a second sealing part removing step in the method for manufacturing the secondary battery according to the first embodiment of the present invention.

In addition, FIG. 4 is a plan view illustrating a first sealing step in the method for manufacturing the secondary battery according to the first embodiment of the present invention, FIG. 5 is a plan view illustrating a second sealing step in the method for manufacturing the secondary battery according to the first embodiment of the present invention, and FIG. 6 is a plan view illustrating a second sealing part removing step in the method for manufacturing the secondary battery according to the first embodiment of the present invention.

Referring to FIGS. 1 to 6, a method for manufacturing a secondary battery according to a first embodiment of the present invention comprises an accommodation step (S10) of accommodating an electrode assembly 120 in a battery case 110, a first sealing step (S20) of performing sealing along outer circumferential surfaces a, b, and c of the battery case 110, an electrolyte injection step (S30) of injecting an electrolyte, a second sealing step (S40) of forming a first sealing part 116 and a second sealing part 117, a second sealing part removing step (S50) of removing a portion on which the second sealing part 117 is formed, and a charging step (S60) of applying electricity to the electrode assembly 120.

In addition, the method for manufacturing the secondary battery according to the first embodiment of the present invention may further comprise an aging step in which a predetermined time elapses so that the electrode assembly 129 is impregnated in the electrolyte and a third sealing step of sealing a portion from which a gas pocket part 114 is removed.

In more detail, referring to FIGS. 1 to 3, in the accommodation step (S10), the electrode assembly 120 may be accommodated in the battery case 110 that comprises an accommodation part 113 in which the electrode assembly 120 is accommodated and a gas pocket part 114 connected to the accommodation part 113 to collect a gas generated in the accommodation part 113.

Here, in the accommodation step (S10), after the electrode assembly 120 is accommodated in the accommodation part 113 formed in the battery case 110 having a sheet shape, the battery case 110 may be folded along a virtual line X to cover the accommodation part 113.

Here, the battery case 110 may comprise an upper case 111 and a lower case 112.

Also, the battery case 110 may be made of a flexible material.

The electrode assembly 120 may be a chargeable and dischargeable power generation element and have a shape in which an electrode and a separator are alternately stacked to be combined each other.

The electrode may comprise a positive electrode and a negative electrode. The positive electrode, the separator, and the negative electrode may be alternately disposed.

Also, the electrode assembly 120 may further comprise an electrode lead 121 connected to an end of the electrode. Here, the electrode assembly 120 may be electrically connected to an external device through the electrode lead 121.

Referring to FIGS. 1 and 4, in the first sealing step (S20), sealing may be performed along the outer circumferential surfaces a, b, and c of the battery case 110, except for an end of the gas pocket part 114. That is, in the first sealing step (S20), the remaining outer circumferential surfaces a, b, and c in three directions, except for the outer circumferential surface d disposed on the end of the gas pocket part 114, among the entire outer circumferential surfaces a, b, c, and d of the battery case 110 in four directions may be sealed to form an initial sealing part 115.

In the electrolyte injection step (S30), the electrolyte may be injected into the accommodation part 113 through the end of the gas pocket part 114. Here, in the electrolyte injection step (S30), for example, a liquid injection tube may be inserted into the end of the gas pocket part 114 to inject the electrolyte from the gas pocket part 114 toward the accommodation part 113.

Referring to FIGS. 1 and 5, in the second sealing step (S40), the end of the gas pocket part 114 may be double-sealed. Here, the first sealing part 116 may be formed at a side closer to the accommodation part 113, and the second sealing part 117 may be formed at a side that is farther from the accommodation part 113.

Also, in the second sealing step (S40), the first sealing part 116 may be discontinuously formed so that a non-fused part S12 for degassing and a fused part S11 are formed along a sealing line L. As a result, when an internal pressure increases due to the gas generated through the subsequent charging step (S60), the non-fused part S12 for degassing may be gaped to discharge the internal gas to the outside through the non-fused part S12 for degassing.

Also, in the second sealing step (S40), the upper case 111 and the lower case 112 may be thermally fused to each other to form the first sealing part 116 and the second sealing part 117. Here, the first sealing part 116 may be sealed so that portions of the upper case 111 and the lower case 112, which are disposed on the non-fused part S12 for degassing, are in contact with each other.

Furthermore, the second sealing step (S40) may be, for example, performed so that a plurality of non-fused parts S12 for degassing are formed.

Also, in the second sealing step (S40), the second sealing part 117 may be formed by continuously sealing an edge of the gas pocket part 114 in the battery case 110.

That is, in the second sealing step (S40), the end of the gas pocket part 114 may be double-sealed. Here, the first sealing part 116 may be partially sealed along the end of the gas pocket part 114, and the second sealing part 117 may be completely sealed. Here, the first sealing part 116 may form a discontinuous sealing line to form an unsealed non-fused part, but the second sealing part 117 may form a continuous sealing line to form a continuous sealing line that is completely fused without the non-fused part.

Referring to FIGS. 1, 5 and 6, in the second sealing part removing step (S50), the portion of the battery case 110, on which the second sealing part 117 is formed, may be removed.

Here, in the second sealing part removing step (S50), a portion of the battery case 110 may be cut along the virtual line between the first sealing part 116 and the second sealing part 117 to remove the portion on which the second sealing part 117 is formed.

In the charging step (S60), electricity may be applied to the electrode assembly 120 to charge the secondary battery 100. Here, the secondary battery 100 may be activated through the charging step (S60).

In the aging step, after performing the charging step S60, a predetermined time may elapse so that the electrode assembly 120 is impregnated in the electrolyte. Here, the electrolyte may be filled between the electrode and the separator through the aging step, and thus, the lithium ions may smoothly move.

Figure 7:
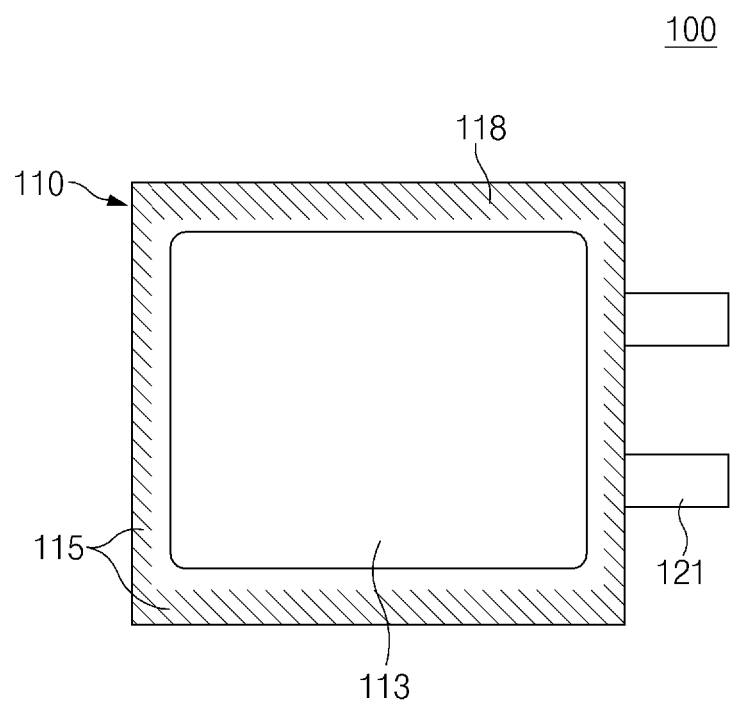
FIG. 7 is a plan view illustrating a third sealing step in the method for manufacturing the secondary battery according to the first embodiment of the present invention.

FIG. 7 is a plan view illustrating the third sealing step in the method for manufacturing the secondary battery according to the first embodiment of the present invention.

Referring to FIGS. 1 and 7, in the third sealing step, after performing the charging step (S60), the gas pocket part 114 may be cut and removed from the battery case 110, and the portion of the battery case 110, from which the gas pocket part 114 is removed, may be sealed to manufacture the secondary battery 100. Here, for example, after the charging step (S60), the aging step may be further performed, and then, the third sealing step may be performed.

Here, when a sealed sealing part 118 is formed on the portion of the battery case 110, from which the gas pocket part 114 is removed, through the third sealing step, the inside of the battery case 110 may be sealed.

Referring to FIGS. 1, 5, and 6, in the method for manufacturing the secondary battery, which comprises the above-described constituents, according to the first embodiment of the present invention, in the second sealing step (S40), the first sealing part 116 is formed so that the non-fused part S12 for degassing and the fused part S11 may be formed on the gas pocket part 114 of the battery case 110, and when the secondary battery 100 is charged, if the internal pressure increases due to the generated gas, the non-fused part S12 for degassing may be gaped to automatically discharge the internal gas to the outside through the non-fused part S12 for degassing. Therefore, the secondary battery 100 may be prevented from increasing in volume, and the gas may not remain in the electrode to prevent the lithium ions from being precipitated.

Also, the battery case 110 may be double-sealed so that the first sealing part 116 that is partially sealed and the second sealing part 117 that is completely sealed are formed in the second sealing step (S40). Then, the second sealing part 117 may be removed before the charging step (S60) to prevent an external gas from being introduced into the battery case 110 in the manufacturing process during the charging step (S60) after the electrolyte is injected into the battery case 110 through the electrolyte injection step (S30).

Referring to FIGS. 1 and 5, in the method for manufacturing the secondary battery according to the first embodiment of the present invention, for example, in the sealing second step (S40), for example, the sealing may be performed so that the non-fused part S12 for degassing has a width that is gradually narrowed toward the end of the battery case 110.

Figure 8:
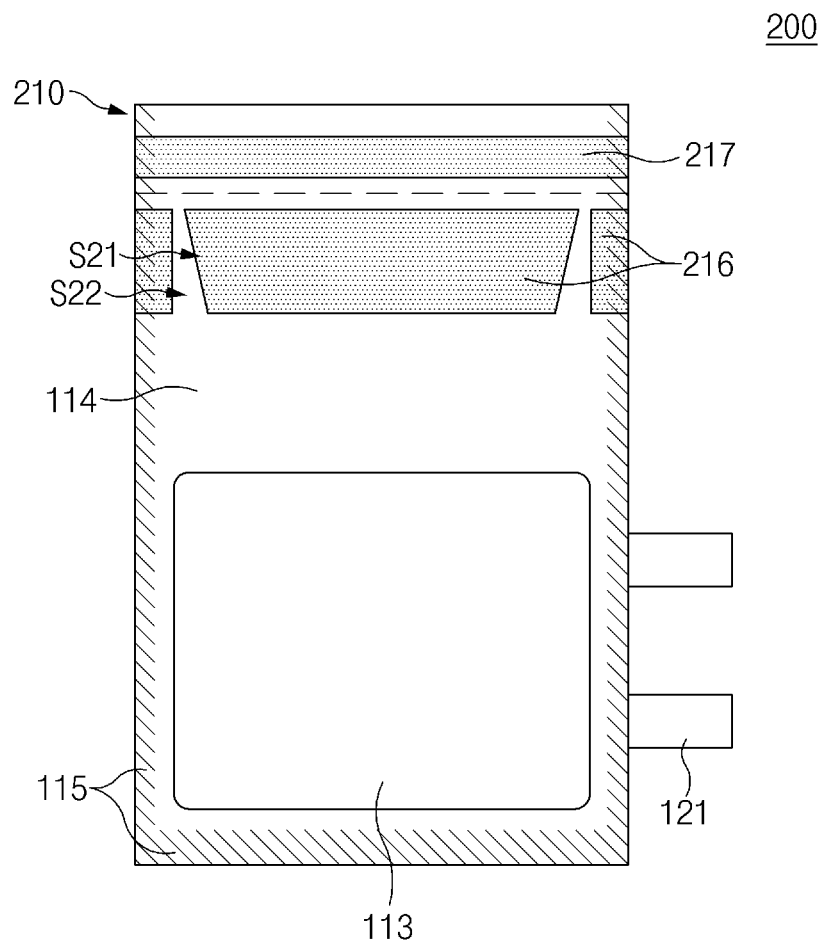
FIG. 8 is a plan view illustrating a second sealing step in a method for manufacturing a secondary battery according to a second embodiment of the present invention.

FIG. 8 is a plan view illustrating a second sealing step in a method for a manufacturing secondary battery according to a second embodiment of the present invention.

Referring to FIGS. 1 and 8, a method for manufacturing a secondary battery according to a second embodiment of the present invention is different from the method for manufacturing the secondary battery according to the foregoing first embodiment in that a first sealing part 216 is formed in a different shape in a second sealing step (S40) to manufacture a secondary battery 200. Thus, contents of this embodiment, which are duplicated with those according to the first embodiment, will be omitted, and also, differences therebetween will be mainly described.

In the method for manufacturing the secondary battery according to the second embodiment of the present invention, in the second sealing step (S40), a first sealing part 216 and a second sealing part 217 are formed. Here, the first sealing part 216 may be discontinuously formed so that a non-fused part S22 for degassing and a fused part S21 are formed along a sealing line. Here, in the second sealing step (S40), for example, the sealing may be performed so that the non-fused part S22 for degassing has a width that is gradually narrowed toward an end of a battery case 210.

Here, in the second sealing step (S40), the first sealing part 216 may be formed so that one side of both sides of the non-fused part S22 for degassing is formed in a linear shape, and the other side is formed in a diagonal shape.

Figure 9:
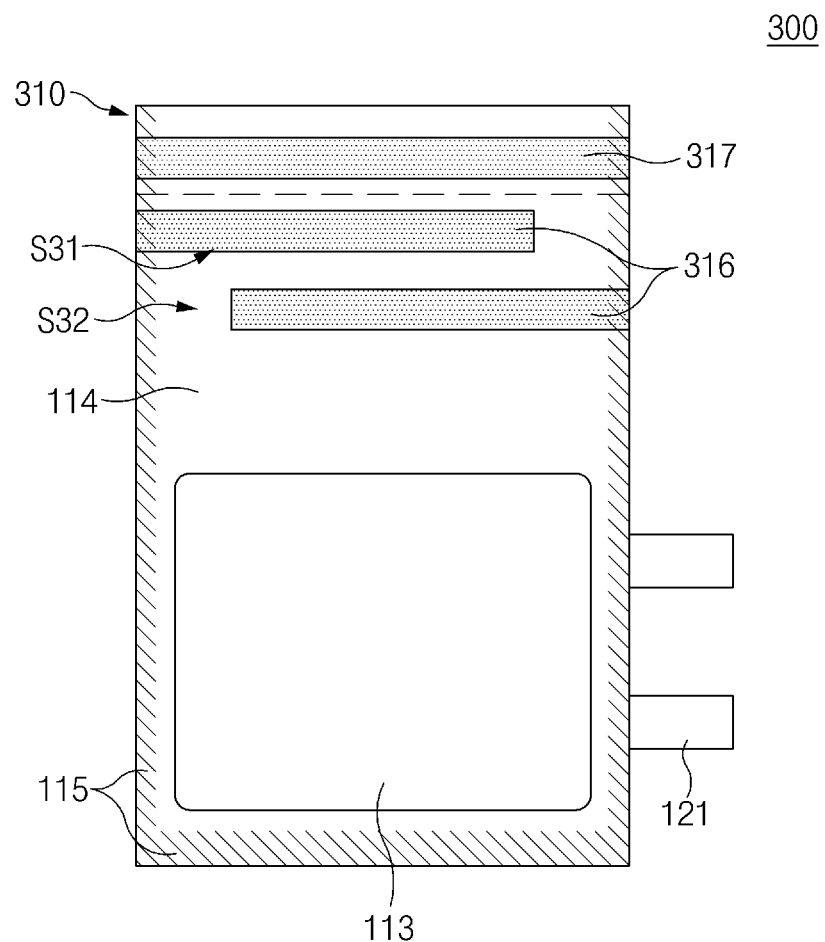
FIG. 9 is a plan view illustrating a second sealing step in a method for manufacturing a secondary battery according to a third embodiment of the present invention.

FIG. 9 is a plan view illustrating a second sealing step in a method for manufacturing a secondary battery according to a third embodiment of the present invention.

Referring to FIGS. 1 and 9, a method for manufacturing a secondary battery according to the third embodiment of the present invention is different from the method for manufacturing the secondary battery according to the foregoing first and second embodiments in that a first sealing part 316 is formed in a different shape in a second sealing step (S40) to manufacture a secondary battery 300. Thus, contents of this embodiment, which are duplicated with those according to the foregoing embodiments, will be omitted, and also, differences therebetween will be mainly described.

In the method for manufacturing the secondary battery according to the third embodiment of the present invention, in the second sealing step (S40), a first sealing part 316 and a second sealing part 317 are formed. Here, the first sealing part 316 may be formed so that a non-fused part S32 for degassing and a fused part S31 are formed. Here, in the second sealing step (S40), for example, the first sealing part 316 may be formed so that the non-fused part S32 for degassing is bent in plurality. As a result, when an internal pressure increases due to a gas generated through a subsequent charging step (S60), the non-fused part S12 for degassing may be gaped to form a path that is bent in plurality, thereby discharging the internal gas to the outside of the battery case 310 through the non-fused part S32 for degassing.

Figure 10:
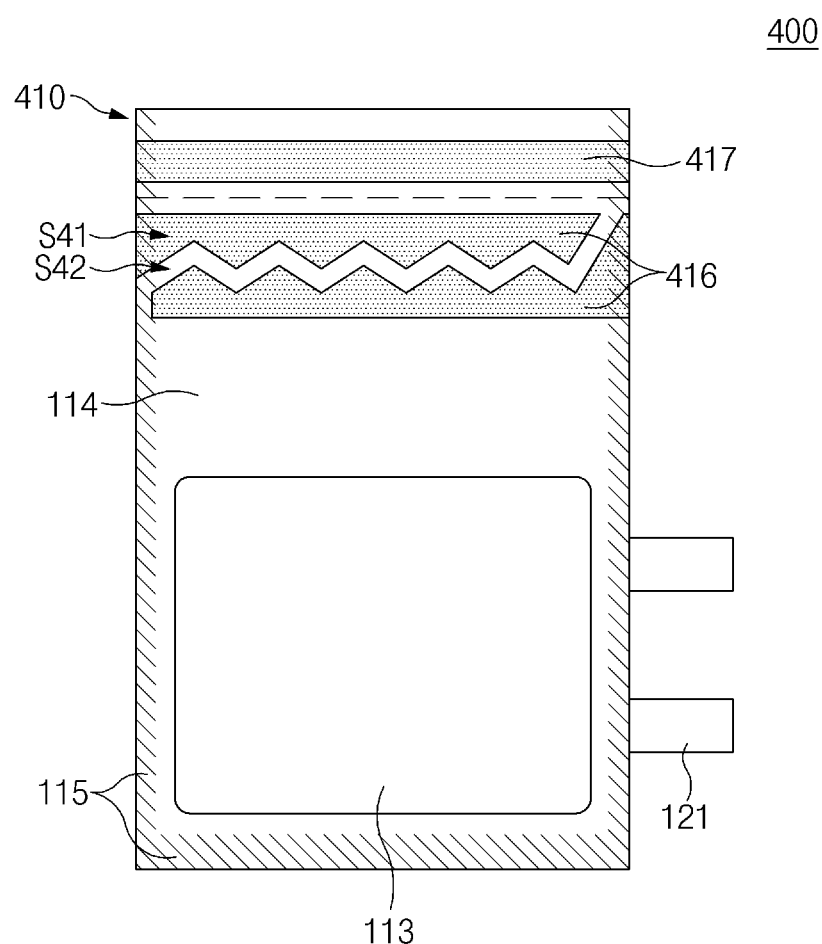
FIG. 10 is a plan view illustrating a second sealing step in a method for manufacturing a secondary battery according to a fourth embodiment of the present invention.

FIG. 10 is a plan view illustrating a second sealing step in a method for manufacturing a secondary battery according to a fourth embodiment of the present invention.

Referring to FIGS. 1 and 10, a method for manufacturing a secondary battery according to the fourth embodiment of the present invention is different from the method for manufacturing the secondary battery according to the foregoing first to third embodiments in that a first sealing part 416 is formed in a different shape in a second sealing step (S40) to manufacture a secondary battery 400. Thus, contents of this embodiment, which are duplicated with those according to the foregoing embodiments, will be omitted, and also, differences therebetween will be mainly described.

In the method for manufacturing the secondary battery according to the fourth embodiment of the present invention, in the second sealing step (S40), a first sealing part 416 and a second sealing part 417 are formed. Here, the first sealing part 416 may be formed so that a non-fused part S42 for degassing and a fused part S41 are formed. Here, in the second sealing step (S40), for example, the sealing is performed so that the non-fused part S42 for degassing is bent in plurality.

Here, in the second sealing step (S40), the non-fused part (S42) for degassing may be sealed to be bent in a zig-zag shape.

As a result, when an internal pressure increases due to a gas generated through a subsequent charging step (S60), the non-fused part S42 for degassing may be gaped to form a path that is bent in the zig-zag shape, thereby discharging the internal gas to the outside of the battery case 410 through the non-fused part S42 for degassing.

Figure 11:
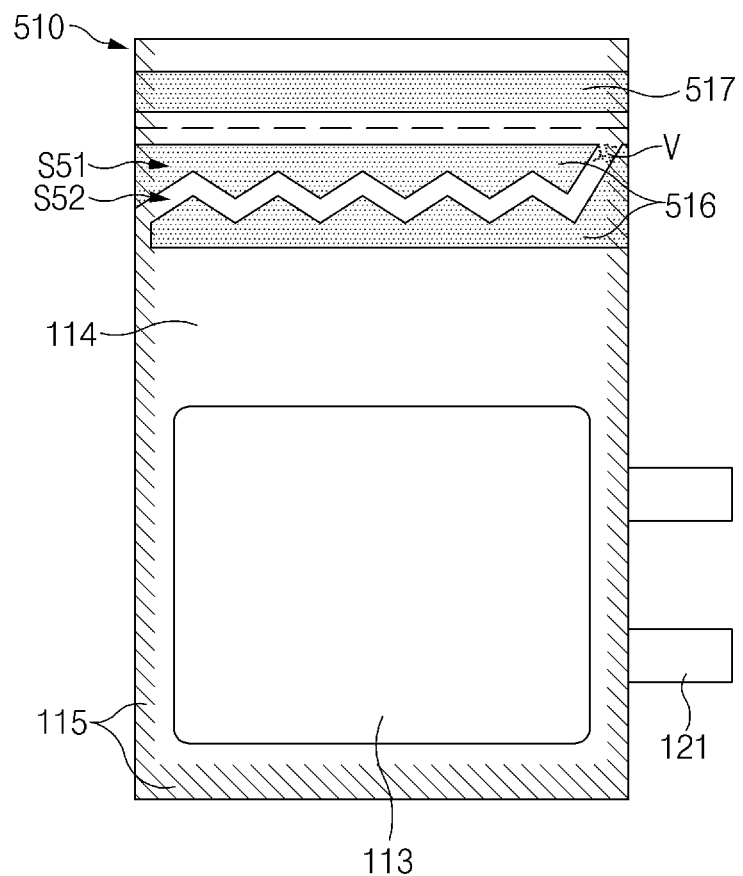
FIG. 11 is a plan view illustrating a second sealing step and a temporary sealing step in a method for manufacturing a secondary battery according to a fifth embodiment of the present invention.
Figure 12:
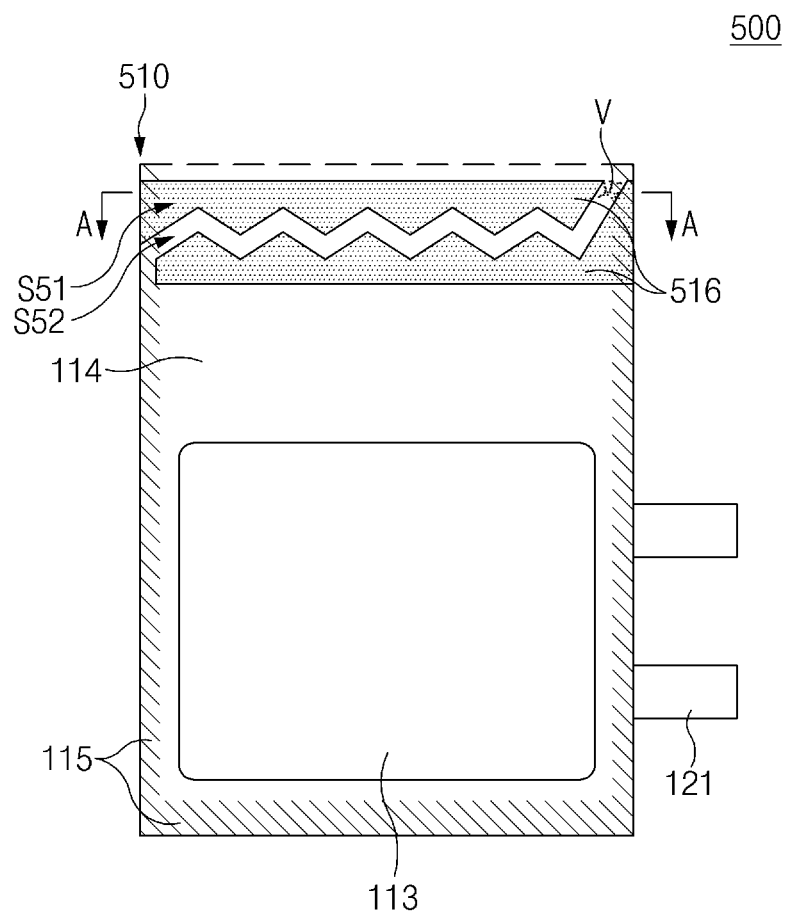
FIG. 12 is a plan view illustrating a second sealing part removing step in the method for manufacturing the secondary battery according to the fifth embodiment of the present invention.
Figure 13:
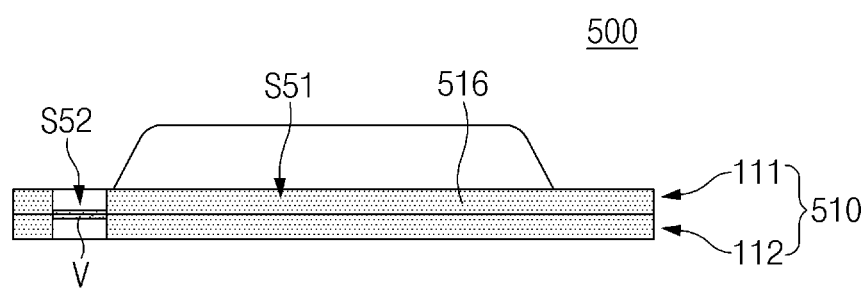
FIG. 13 is a cross-sectional view taken along line A-A' of FIG. 12.

FIG. 11 is a plan view illustrating a second sealing step and a temporary sealing step in a method for manufacturing a secondary battery according to a fifth embodiment of the present invention, FIG. 12 is a plan view illustrating a second sealing part removing step in the method for the secondary battery according to the fifth embodiment of the present invention, and FIG. 13 is a cross-sectional view taken along line A-A' of FIG. 12.

Referring to FIGS. 1 to 11, a method for manufacturing the secondary battery according to a fifth embodiment of the present invention is different from the method for manufacturing the secondary battery according to the foregoing first to fourth embodiments of the present invention in that a temporary sealing step is further performed to manufacture a secondary battery 500. Thus, contents of this embodiment, which are duplicated with those according to the foregoing embodiments, will be omitted, and also, differences therebetween will be mainly described.

Referring to FIGS. 1 and 11 to 13, in the method for manufacturing the secondary battery according to the fifth embodiment of the present invention, in the second sealing step (S40), a first sealing part 516 and a second sealing part 517 are formed. Here, the first sealing part 516 may be formed so that a non-fused part S52 for degassing and a fused part S51 are formed. Here, in the second sealing step (S40), for example, the sealing is performed so that the non-fused part S52 for degassing is bent in a zig-zag shape.

In the temporary sealing step, an adhesive solution V is placed on an end of the non-fused part S52 for degassing, and an upper case 111 and a lower case 112, which are disposed on the non-fused part S52 for degassing, adhere to each other. Thus, it may prevent foreign substances or moisture from being introduced into a battery case 510 through the non-fused part S52 for degassing after the second sealing part is removed through a second sealing part removing step (S50). Here, when the internal pressure reaches a predetermined pressure or more, adhesive force between the upper case 111 and the lower case 112, which are disposed on the non-fused part S52 for degassing, may be released to discharge a gas.

The temporary sealing step may be, for example, performed after forming the first sealing part 516 in the second sealing step (S40).

Also, for another example, the temporary sealing step may be performed in a state in which the second sealing part 517 is removed after the second sealing part removing step S50.

While the present invention has been particularly shown and described with reference to exemplary embodiments thereof, it is to be understood that the scope of the present invention is not limited to the method for manufacturing the secondary battery according to the present invention. It will be understood by those of ordinary skill in the art that various changes in form and details may be made therein without departing from the spirit and scope of the present invention.

Furthermore, the scope of protection of the present invention will be clarified by the appended claims.

DESCRIPTION OF THE SYMBOLS 100, 200, 300, 400, 500: Secondary battery
110, 210, 310, 410, 510: Battery case
111: Upper case
112: Lower case
113: Accommodation part
114: Gas pocket part
115: Initial sealing part
116, 216, 316, 416, 516: First sealing part
117, 217, 317, 417, 517: Second sealing part
118: Sealed sealing part
120: Electrode assembly
121: Electrode lead
a, b, c, d: Outer circumferential surface
S11, S21, S31, S41, S51: Fused part
S12, S22, S32, S42, S52: Non-fused part
V: Adhesive solution

The invention claimed is:

1. A method for manufacturing a secondary battery, the method comprising:
  an accommodation step of accommodating an electrode assembly in a battery case comprising an accommodation part, in which the electrode assembly is accommodated, and a gas pocket part connected to the accommodation part to collect a gas generated in the accommodation part;
  a first sealing step of performing sealing along an outer circumferential surface of the battery case except for an end of the gas pocket part;
  an electrolyte injection step of injecting an electrolyte into the accommodation part through the end of the gas pocket part;

a second sealing step of performing double sealing on the end of the gas pocket part so that a first sealing part is formed at a side closer to the accommodation part, and a second sealing part is formed at a side that is farther from the accommodation part;

a second sealing part removing step of removing a portion, on which the second sealing part is formed, from the battery case, while the first sealing part remains at the end of the gas pocket part of the battery case; and a charging step of applying electricity to the electrode assembly to charge the secondary battery, wherein, in the second sealing step, the first sealing part is discontinuously formed so that a non-fused part for degassing and a fused part are formed along a sealing line, and when an internal pressure increases due to a gas generated through the charging step, the non-fused part for degassing is gaped to discharge the gas to an outside through the non-fused part for degassing.

2. The method of claim 1, further comprising, after the charging step is performed, an aging step in which a predetermined time elapses so that the electrode assembly is impregnated in the electrolyte.

3. The method of claim 1, wherein the battery case comprises an upper case and a lower case, and in the second sealing step, the upper case and the lower case are thermally fused to each other to form the first sealing part and the second sealing part, wherein the first sealing part is sealed so that portions of the upper case and the lower case, which are disposed at the non-fused part for degassing, are in contact with each other.

4. The method of claim 3, wherein, in the second sealing step, the first sealing part is discontinuously formed so that the non-fused part for degassing includes a plurality of non-fused parts for degassing.

5. The method of claim 3, wherein, in the second sealing step, the first sealing part is formed so that the non-fused part for degassing has a width that is narrowed toward an end of a battery case.

6. The method of claim 5, wherein, in the second sealing step, the first sealing part is formed so that one side of the non-fused part for degassing is formed in a linear shape, and another side of the non-fused part for degassing is formed in a diagonal shape.

7. The method of claim 3, wherein, in the second sealing step, the first sealing part is formed so that the non-fused part for degassing is bent in plurality.

8. The method of claim 7, wherein, in the second sealing step, the first sealing part is formed so that the non-fused part for degassing is bent in a zig-zag shape.

9. The method of claim 3, further comprising a temporary sealing step in which an adhesive solution is placed on an end of the non-fused part for degassing, and the upper case and the lower case, which are disposed at the non-fused part for degassing, adhere to each other with an adhesive force, wherein when the internal pressure reaches a predetermined pressure or more, the adhesive force between the upper case and the lower case, which are disposed at the non-fused part for degassing, is released to discharge the gas.

10. The method of claim 9, wherein the temporary sealing step is performed after the first sealing part is formed in the second sealing step.

11. The method of claim 9, wherein the temporary sealing step is performed in a state in which the second sealing part is removed after the second sealing part removing step.

12. The method of claim 1, further comprising, after the charging step is performed, a third sealing step of cutting and removing the gas pocket part from the battery case, and sealing a portion of the battery case from which the gas pocket part is removed.

13. The method of claim 1, wherein the battery case is made of a flexible material.

\* \* \* \* \*